United States Patent
Ahn

(10) Patent No.: US 12,003,315 B2
(45) Date of Patent: Jun. 4, 2024

(54) BROADCAST RECEPTION DEVICE AND OPERATING METHOD THEREFOR

(71) Applicant: LG ELECTRONICS INC., Seoul (KR)

(72) Inventor: Mooki Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 17/773,825

(22) PCT Filed: Nov. 1, 2019

(86) PCT No.: PCT/KR2019/014767
§ 371 (c)(1),
(2) Date: May 2, 2022

(87) PCT Pub. No.: WO2021/085699
PCT Pub. Date: May 6, 2021

(65) Prior Publication Data
US 2022/0385386 A1    Dec. 1, 2022

(51) Int. Cl.
*H04H 20/76*    (2008.01)
*H04H 40/00*    (2009.01)
(Continued)

(52) U.S. Cl.
CPC ............. *H04H 20/76* (2013.01); *H04H 40/00* (2013.01); *H04N 5/44* (2013.01); *H04N 5/50* (2013.01)

(58) Field of Classification Search
CPC .......... H04H 20/76; H04H 40/00; H04N 5/50; H04N 7/102; H04N 5/44
See application file for complete search history.

(56) References Cited

U.S. PATENT DOCUMENTS 10,141,971 B1 * 11/2018 Elkholy ................. H04B 1/18
10,462,418 B2 * 10/2019 Won .................... G01R 31/2812
(Continued)

FOREIGN PATENT DOCUMENTS

JP       2014171099        9/2014
KR    1020070020912        2/2007
(Continued)

OTHER PUBLICATIONS

Machine translation of CN-101034905-A (Year: 2023).*
(Continued)

*Primary Examiner* — Jean B Corrielus
(74) *Attorney, Agent, or Firm* — LEE, HONG, DEGERMAN, KANG & WAIMEY

(57) ABSTRACT

A method and corresponding broadcast reception device that includes: an impedance matching circuit for adjusting an input impedance value of the broadcast reception device; and a control unit, wherein the control unit can control the impedance matching circuit so as to adjust the input impedance value to a predetermined reference impedance value when the mode of the broadcast reception device is a mode for receiving a broadcast signal through a cable, and control the impedance matching circuit so as to adjust the input impedance value to be less than the predetermined reference impedance value when the mode of the broadcast reception device is not the mode for receiving a broadcast signal through a cable.

11 Claims, 9 Drawing Sheets

(51) Int. Cl.
*H04N 5/44* (2011.01)
*H04N 5/50* (2006.01)

(56) References Cited

U.S. PATENT DOCUMENTS

| | | | |
|---|---|---|---|
| 2007/0042734 A1 | 2/2007 | Ryu et al. | |
| 2008/0143377 A1* | 6/2008 | Cho | H03K 19/0005 326/30 |
| 2009/0280739 A1* | 11/2009 | Saar | H04H 20/76 455/62 |
| 2012/0222082 A1 | 8/2012 | Su et al. | |
| 2013/0063223 A1* | 3/2013 | See | H03F 1/56 333/32 |
| 2016/0294436 A1* | 10/2016 | Din | H04B 17/336 |
| 2018/0041244 A1* | 2/2018 | Ding | H04B 1/48 |

FOREIGN PATENT DOCUMENTS

| | | |
|---|---|---|
| KR | 100808244 | 3/2008 |
| KR | 1020100011234 | 2/2010 |
| KR | 101067112 | 9/2011 |

OTHER PUBLICATIONS

Machine translation of WO-2013186833-A1. (Year: 2013).*
Machine translation of CN-107942140-A. (Year: 2018).*
Machine translation of JP-2004015348-A. (Year: 2004).*
Korean Intellectual Property Office Application Serial No. 10-2022-7005869, Office Action dated Mar. 22, 2023, 4 pages.
PCT International Application No. PCT/KR2019/014767, International Search Report dated Jul. 29, 2020, 4 pages.
European Patent Office Application Serial No. 19950806.0, Search Report dated Jun. 29, 2023, 12 pages.

* cited by examiner

10

BROADCAST RECEPTION DEVICE AND OPERATING METHOD THEREFOR

CROSS-REFERENCE TO RELATED APPLICATIONS

This application is the National Stage filing under 35 U.S.C. 371 of International Application No. PCT/KR2019/014767, filed on Nov. 1, 2019, the contents of which are all incorporated by reference herein in their entirety.

TECHNICAL FIELD

The present disclosure relates to a broadcast receiving apparatus for receiving a broadcast signal and an operating method thereof.

BACKGROUND ART

An image display device is a device having a function of displaying an image that a user can watch. For example, the image display device may include a monitor, a television (TV), and the like.

The image display device displays a broadcast channel selected by a user from among broadcast signals transmitted from a broadcast station on a display. In this case, the video display device may directly receive a broadcast signal, or a device such as a set-top box may receive a broadcast signal and transmit a signal corresponding to the broadcast channel selected by the user to the video display device.

The broadcast receiving apparatus for receiving a broadcast signal as described above may receive a broadcast signal wirelessly through an antenna, as in Prior Art 1 (Korean Patent Publication No. 10-2016-0021538), or may receive a broadcast signal by wire through a cable.

When the broadcast receiving apparatus receives a broadcast signal through a cable, a return loss may occur due to a difference between a characteristic impedance of cable and an input impedance of broadcast receiving apparatus. In this case, when a signal returned through a cable increases due to the increase in the return loss, there is a problem in that noise increases in a broadcast network that supplies a broadcast signal, so that a general broadcast receiving apparatus has impedance matching with the cable.

Meanwhile, a conventional broadcast receiving apparatus may include an amplifying circuit for amplifying a broadcast signal. At this time, in the case where the amplifier circuit includes an amplifier whose gain varies according to the magnitude of the input current/input voltage, if a gain is increased by increasing an input impedance value of the amplifier, a weak broadcast signal can be further amplified. However, there is a problem in that the return loss increases as the difference between the characteristic impedance of the cable and the input impedance of the broadcast receiving apparatus increases.

DISCLOSURE

Technical Problem

The present disclosure has been made in view of the above problems, and provides a broadcast receiving apparatus capable of appropriately amplifying a broadcast signal, while satisfying a reference related to return loss by adjusting an input impedance value of a broadcast receiving apparatus according to a mode of the broadcast receiving apparatus.

Technical Solution

In order to achieve the above object, a broadcast receiving apparatus according to an embodiment of the present disclosure includes an impedance matching circuit configured to adjust an input impedance value of the broadcast receiving apparatus; and a controller, wherein, the controller controls the impedance matching circuit so that the input impedance value is adjusted to a certain reference impedance value, when a mode of the broadcast receiving apparatus is a mode of receiving a broadcast signal through a cable, and controls the impedance matching circuit so that the input impedance value is adjusted to be less than the certain reference impedance value, when the mode of the broadcast receiving apparatus is not the mode of receiving the broadcast signal through the cable.

In addition, the broadcast receiving apparatus according to an embodiment of the present disclosure further includes a low-noise amplifier which bypasses or low-noise amplifies the broadcast signal, wherein the certain reference value is an impedance value to satisfy a certain reference related to a return loss with respect to the broadcast signal.

In addition, in a case of a mode of receiving the broadcast signal through the cable, when searching at least one broadcast channel through the broadcast signal, the controller of the broadcast receiving apparatus according to an embodiment of the present disclosure controls the impedance matching circuit so that the input impedance value is adjusted to be less than the certain reference impedance value.

In addition, in the case of the mode of receiving the broadcast signal through the cable, the controller of the broadcast receiving apparatus according to an embodiment of the present disclosure checks a signal strength of a broadcast channel set as a main channel, controls the impedance matching circuit to adjust the input impedance value to the certain reference impedance value when the signal strength of the broadcast channel set as the main channel is greater than or equal to a certain reference signal strength, and controls the impedance matching circuit to adjust the input impedance value to be less than the certain reference impedance value when the signal strength of the broadcast channel set as the main channel is less than the certain reference signal strength.

In addition, the controller of the broadcast receiving apparatus according to an embodiment of the present disclosure controls the impedance matching circuit so that the input impedance value decreases as the signal strength of the broadcast channel set as the main channel decreases.

In addition, the controller of the broadcast receiving apparatus according to an embodiment of the present disclosure controls the impedance matching circuit so that the input impedance value is adjusted to a first auxiliary impedance value smaller than the certain reference impedance value, when the signal strength of the broadcast channel set as the main channel is less than the certain reference signal strength, and is greater than or equal to an auxiliary signal strength, and controls the impedance matching circuit so that the input impedance value is adjusted to a second auxiliary impedance value smaller than the first auxiliary impedance value, when the signal strength of the broadcast channel set as the main channel is less than the auxiliary signal strength.

In addition, in the case of not the mode of receiving the broadcast signal through the cable, or in the case of searching a broadcast channel through the broadcast signal in the mode of receiving the broadcast signal through the cable, the controller of the broadcast receiving apparatus according to an embodiment of the present disclosure controls the impedance matching circuit so that the input impedance value is adjusted to the second auxiliary impedance value.

In addition, the impedance matching circuit of the broadcast receiving apparatus according to an embodiment of the present disclosure includes a variable resistor disposed in an input terminal of the low-noise amplifier, wherein the controller changes a resistance value of the variable resistor so that the input impedance value is adjusted.

Meanwhile, in order to achieve the above object, a method of operating a broadcast receiving apparatus according to an embodiment of the present disclosure includes a first operation of adjusting an input impedance value of the broadcast receiving apparatus to a certain reference impedance value, when a mode of the broadcast receiving apparatus is a mode of receiving a broadcast signal through a cable; and a second operation of adjusting the input impedance value to be less than the certain reference impedance value, when the mode of the broadcast receiving apparatus is not the mode of receiving the broadcast signal through the cable.

In addition, in the method of operating a broadcast receiving apparatus according to an embodiment of the present disclosure, the certain reference impedance value is an impedance value that enables a return loss for the broadcast signal to satisfy a certain reference.

In addition, the first operation of the method of operating a broadcast receiving apparatus according to an embodiment of the present disclosure includes a third operation of adjusting the input impedance value to be less than the certain reference impedance value, when searching a broadcast channel through the broadcast signal.

In addition, the first operation of the method of operating a broadcast receiving apparatus according to an embodiment of the present disclosure further includes an operation of checking a signal strength of a broadcast channel set as a main channel; a fourth operation of adjusting the input impedance value to the certain reference impedance value, when the signal strength of the broadcast channel set as the main channel is greater than or equal to a certain reference signal strength; and a fifth operation of adjusting the input impedance value to be less than the certain reference impedance value, when the signal strength of the broadcast channel set as the main channel is less than the certain reference signal strength.

In addition, the fifth operation of the method of operating a broadcast receiving apparatus according to an embodiment of the present disclosure adjusts the input impedance value to decrease, as the signal strength of the broadcast channel set as the main channel decreases.

In addition, the fifth operation of the method of operating a broadcast receiving apparatus according to an embodiment of the present disclosure adjusts the input impedance value to a first auxiliary impedance value smaller than the certain reference impedance value, when the signal strength of the broadcast channel set as the main channel is less than the certain reference signal strength, and is greater than or equal to an auxiliary signal strength, and adjusts the input impedance to a second auxiliary impedance value smaller than the first auxiliary impedance value, when the signal strength of the broadcast channel set as the main channel is less than the auxiliary signal strength, when the signal strength of the broadcast channel set as the main channel is less than the auxiliary signal strength.

In addition, at least one of the second operation and the third operation of the method of operating a broadcast receiving apparatus according to an embodiment of the present disclosure adjusts the input impedance value to the second auxiliary impedance value less than the certain reference value.

Advantageous Effects

The effect of the image display device according to the present disclosure will be described as follows.

According to at least one embodiment of the present disclosure, it is possible to appropriately amplify a broadcast signal while satisfying the criteria related to return loss, thereby reducing network management costs of network operators and providing users with better quality broadcast images.

Further scope of applicability of the present disclosure will become apparent from the following detailed description. However, it should be understood that the detailed description and specific embodiments such as preferred embodiments of the present disclosure are given by way of illustration only, since various changes and modifications within the spirit and scope of the present disclosure may be clearly understood by those skilled in the art.

MODE FOR INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function. Accordingly, the terms "module" and "unit" may be used interchangeably.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

In addition, in the present application, although the terms first, second, etc. may be used to describe various elements, these elements should not be limited by these terms. These terms are only used to distinguish one element from another.

Figure 1A:
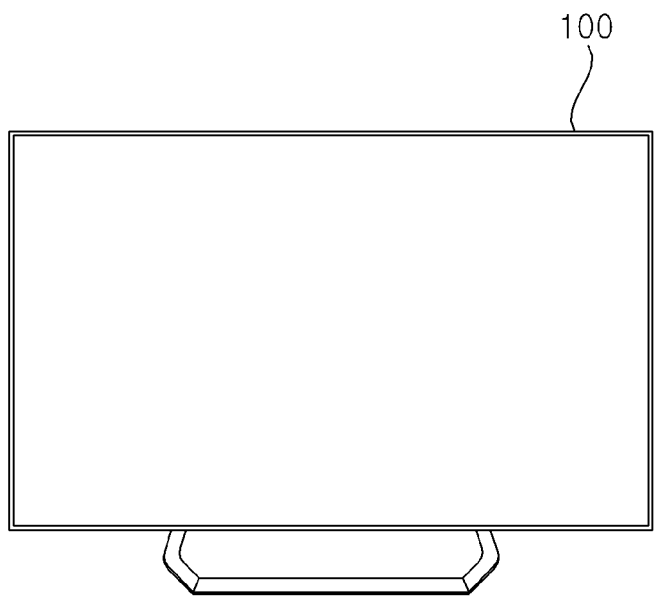
FIGS. 1A and 1B are diagrams illustrating an image display system according to various embodiments of the present disclosure.
Figure 1A:
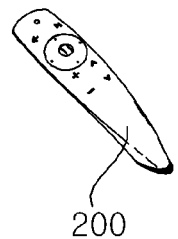
Figure 1B:
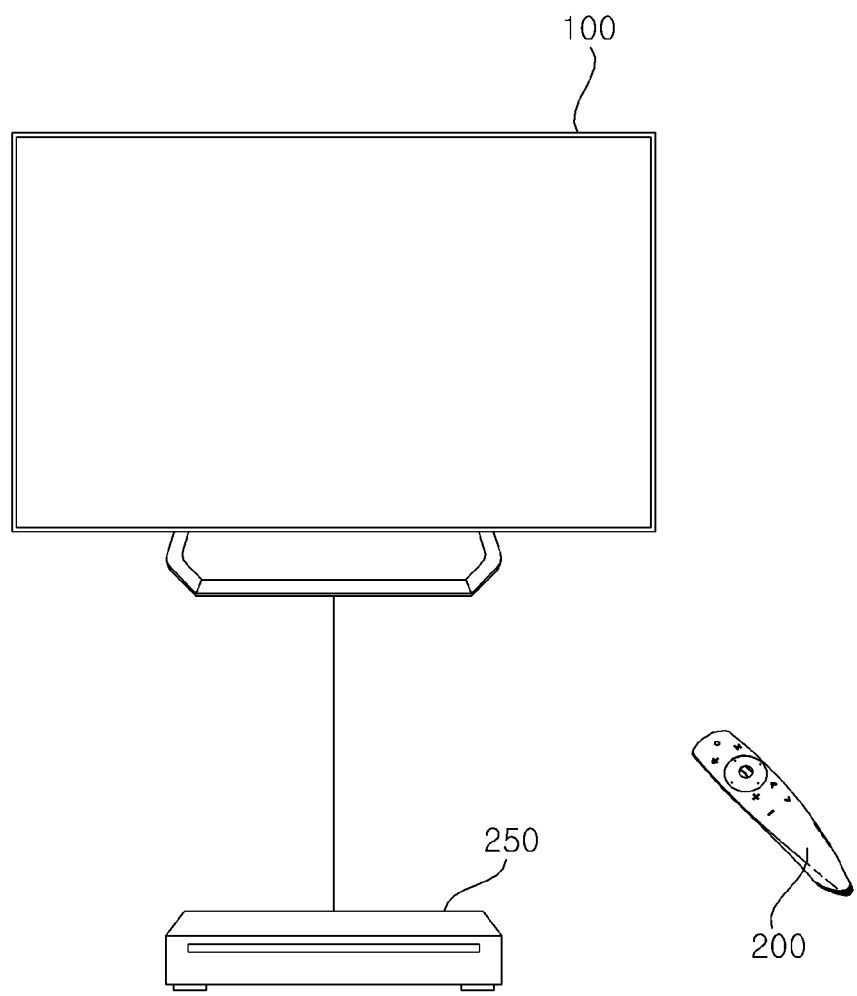

Referring to FIGS. 1A and 1B are diagrams illustrating a connection state between a broadcast receiving apparatus and an external device, according to various embodiments of the present disclosure.

Referring to FIG. 1A, an image display system 10 may include an image display device 100 and/or a remote control device 200.

The image display device 100 may be a device that processes and outputs an image. The image display device 100 is not particularly limited as long as it can output a screen corresponding to an image signal, such as a TV, a notebook computer, and a monitor.

The image display device 100 may receive a broadcast signal, process it, and output a signal-processed broadcast image. When the image display device 100 receives a broadcast signal, the image display device 100 may correspond to a broadcast receiving apparatus.

The image display device 100 may receive a broadcast signal wirelessly through an antenna, or may receive a broadcast signal by wire through a cable.

For example, the image display device 100 may receive a terrestrial broadcast signal, a satellite broadcast signal, a cable broadcast signal, an Internet Protocol Television (IPTV) broadcast signal, and the like.

The remote control device 200 may be connected to the image display device 100 by wire and/or wirelessly to provide various control signals to the image display device 100. At this time, the remote control device 200 may include a device that establishes a wired or wireless network with the image display device 100 and transmits various control signals to the image display device 100 through a established network, or receives a signal related to various operations processed in the image display device 100 from the image display device 100.

For example, various input devices such as a mouse, a keyboard, a space remote control, a trackball, and a joystick may be used as the remote control device 200. The remote control device 200 may be referred to as an external device, and hereinafter, it is clarified in advance that an external device and a remote control device can be used interchangeably as necessary.

The image display device 100 may be connected to only a single remote control device 200 or may be simultaneously connected to two or more remote control devices 200, and may change an object displayed on a screen or adjust the state of a screen, based on a control signal provided from each remote control device 200.

Meanwhile, referring to FIG. 1B, a set-top box 250 may receive a broadcast signal, and process and transmit it to the image display device 100, and the image display device 100 may output an image, based on a signal received from the set-top box 250. When the set-top box 250 receives a broadcast signal, the set-top box 250 may correspond to a broadcast receiving apparatus.

The set-top box 250 may receive a broadcast signal wirelessly through an antenna, or may receive a broadcast signal by wire through a cable.

The remote control device 200 may be connected to the image display device 100 and/or the set-top box 250 by wire and/or wirelessly. For example, a single remote control device 200 may be connected to the image display device 100 and the set-top box 250, or a plurality of remote control devices 200 may be connected to the image display device 100 and the set-top box 250 respectively.

Figure 2A:
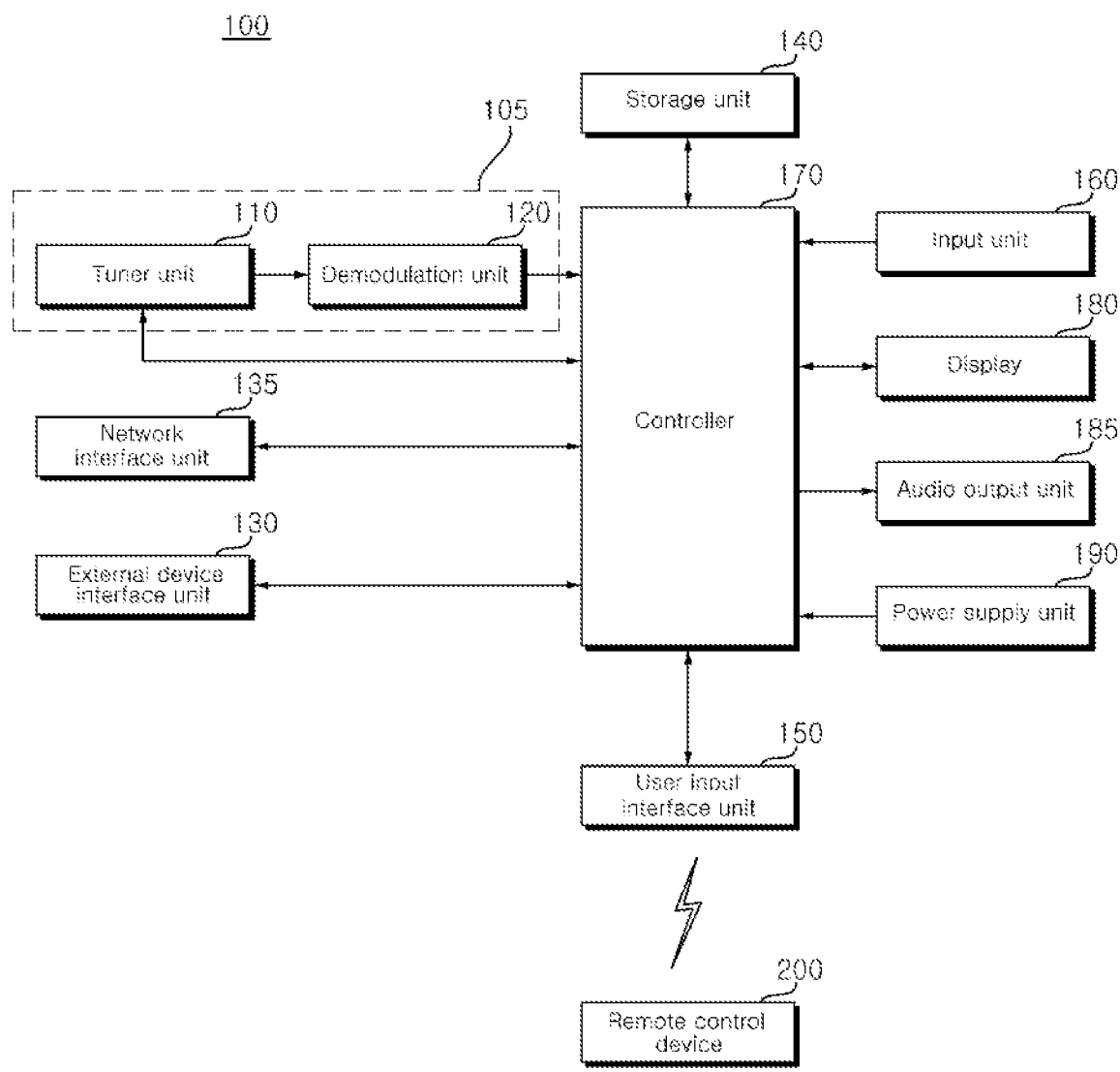
FIG. 2A is an internal block diagram of a broadcast receiving apparatus of FIG. 1A.
Figure 2B:
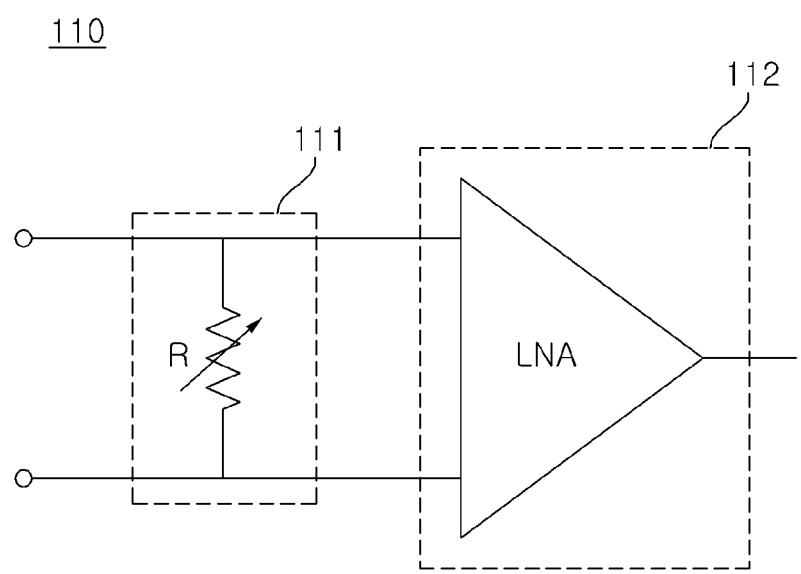
FIG. 2B is an internal circuit diagram of a tuner unit.

FIG. 2A is an internal block diagram of the broadcast receiving apparatus of FIG. 1A, and FIG. 2B is an internal circuit diagram of a tuner unit provided in the broadcast receiving apparatus.

Referring to FIG. 2A, the image display device 100 for receiving a broadcast signal may include a broadcast receiving unit 105, an external device interface unit 130, a network interface unit 135, a storage unit 140, a user input interface unit 150, an input unit 160, a controller 170, a display 180, an audio output unit 185, and/or a power supply unit 190.

The broadcast receiving unit 105 may include a tuner unit 110 and a demodulation unit 120. Meanwhile, unlike the drawing, the image display device 100 can include only the broadcast receiving unit 105 and the external device interface unit 130, among the broadcast receiving unit 105, the external device interface unit 130, and the network interface unit 135. That is, the image display device 100 may not include the network interface unit 135.

The tuner unit 110 may select a broadcast signal corresponding to a channel selected by a user or all previously stored channels among broadcast signals received through an antenna (not shown) or a cable (not shown). The tuner unit 110 may convert the selected broadcast signal into an intermediate frequency signal or a baseband image or a voice signal.

For example, if the selected broadcast signal is a digital broadcast signal, the tuner unit 110 may convert into a digital IF signal (DIF), and if the selected broadcast signal is an analog broadcast signal, may convert into an analog baseband image or a voice signal (CVBS/SIF). That is, the tuner unit 110 may process a digital broadcast signal or an analog broadcast signal. An analog baseband image or voice signal (CVBS/SIF) output from the tuner unit 110 may be directly input to the controller 170.

Meanwhile, the tuner unit 110 may sequentially select a broadcast signal of all broadcast channels stored through a channel storage function among the received broadcast signals, and convert the selected broadcast signal into an intermediate frequency signal or a baseband image or voice signal.

Meanwhile, the tuner unit 110 can include a plurality of tuners in order to receive broadcast signals of a plurality of channels. Alternatively, a single tuner that simultaneously receives broadcast signals of a plurality of channels is also possible.

Meanwhile, the tuner unit 110 may include an impedance matching circuit (not shown) for adjusting the input impedance of the image display device 100, and an amplifying circuit (not shown) for bypassing or amplifying the received broadcast signal.

The impedance matching circuit may include at least one variable element whose impedance is changed according to a control signal received from the controller 170. For example, the impedance matching circuit may include at least one of a variable resistor, a variable inductor, and a variable capacitor.

The amplifying circuit may include at least one amplifier (not shown) whose gain varies according to the magnitude of input current/input voltage. In this regard, it will be described with reference to FIG. 2B.

Referring to FIG. 2B, an impedance matching circuit 111 may be disposed in an input terminal of an amplifying circuit 112.

The impedance matching circuit 111 may be disposed in an input terminal of the amplifying circuit 112.

The amplifying circuit 112 may include a low-noise amplifier (LNA) whose gain varies according to the magnitude of the input current.

The impedance matching circuit 111 may include at least one variable resistor R. In this case, the variable resistor R may be connected in parallel to the input terminal of the low noise amplifier N, and the resistance value may be changed according to the control of the controller 170.

Meanwhile, as the resistance value of the variable resistor R is changed, the input impedance value of the image display device 100 may be changed. In this case, according to a change in the input impedance value of the image display device 100, the magnitude of the input current input to the low noise amplifier N may be changed, and thus, the gain of the low noise amplifier N may be changed.

The demodulation unit 120 may receive a digital IF signal DIF converted by the tuner unit 110 and perform a demodulation operation.

The demodulation unit 120 may output a stream signal TS after performing demodulation and channel decoding. In this case, the stream signal may be a signal obtained by multiplexing an image signal, a voice signal, or a data signal.

The stream signal output from the demodulation unit 120 may be input to the controller 170. After performing demultiplexing and image/voice signal processing, the controller 170 may output an image through the display 180, and output a voice through the audio output unit 185.

The external device interface unit 130 may transmit or receive data to or from a connected external device. To this end, the external device interface unit 130 may include an A/V input/output unit (not shown).

The external device interface unit 130 may be connected to an external device such as a Digital Versatile Disk (DVD), Blu-ray, game device, camera, camcorder, computer (laptop), set-top box, and the like by wire/wireless, and may perform input/output operations with an external device.

In addition, the external device interface unit 130 establishes a communication network with various remote control devices 200 as shown in FIG. 1A, and may receive a control signal related to the operation of the image display device 100 from the remote control device 200, or transmit data related to the operation of the image display device 100 to the remote control device 200.

The A/V input/output unit may receive image and voice signals of an external device.

The external device interface unit 130 may include a wireless communication unit (not shown) for short-range wireless communication with other electronic device.

Through such a wireless communication unit (not shown), the external device interface unit 130 may exchange data with an adjacent mobile terminal. In particular, the external device interface unit 130 may receive device information, executing application information, an application image, and the like, from the mobile terminal in a mirroring mode.

The network interface unit 135 may provide an interface for connecting the image display device 100 to a wired/wireless network containing an Internet network. For example, the network interface unit 135 may receive content or data provided by the Internet or a content provider or network operator through a network.

Meanwhile, the network interface unit 135 may include a communication module (not shown) for connection to a wired/wireless network.

The storage unit 140 may store a program inside the controller 170 for processing and controlling each signal, or may store a signal-processed image, voice, or data signal.

For example, the storage unit 140 stores application programs designed for the purpose of performing various tasks that can be processed by the controller 170, and upon request of the controller 170, may selectively provide some of the stored application programs.

The program stored in the storage unit 140, or the like is not particularly limited as long as it can be executed by the controller 170.

The storage unit 140 may perform a function for temporarily storing an image, voice, or data signal received from an external device through the external device interface unit 130.

The storage unit 140 may store information related to a certain broadcast channel through a channel storage function such as a channel map.

FIG. 2A shows an embodiment in which the storage unit 140 is provided separately from the controller 170, but the scope of the present disclosure is not limited thereto, and the storage unit 140 may be included in the controller 170.

The user input interface unit 150 may transmit a signal input by a user to the controller 170, or may transmit a signal from the controller 170 to the user.

For example, it may transmit/receive a user input signal such as power on/off, channel selection, and screen setting from the remote control device 200, or transmit a user input signal input from a local key (not shown) such as a power key, a channel key, a volume key, and a setting value to the controller 170, or transmit a user input signal input from a sensor unit (not shown) that senses a user's gesture to the controller 170, or transmit a signal from the controller 170 to the sensor unit.

The input unit 160 may be provided in one side of a main body of the image display device 100. For example, the input unit 160 may include a touch pad, a physical button, and the like.

The input unit 160 may receive various user commands related to the operation of the image display device 100, and may transmit a control signal corresponding to the input command to the controller 170.

The controller 170 may include at least one processor, and may control the overall operation of the image display device 100 by using the included processor. Here, the processor may be a general processor such as a central processing unit (CPU). Obviously, the processor may be a dedicated device such as an ASIC or other hardware-based processor.

The controller 170 may demultiplex a stream input through the tuner unit 110, the demodulation unit 120, the external device interface unit 130, or the network interface unit 135, or may process the demultiplexed signals to generate and output a signal for image or voice output.

The controller 170 may set a mode of the image display device 100, and may operate according to the mode. For example, the controller 170 may set the mode of the image display device 100 according to a user input signal input through the input unit 160.

The controller 170 may set a mode (hereinafter, referred to as a reception mode) for a reception method of broadcast signal. For example, the controller 170 may set any one of a mode (hereinafter, antenna reception mode) that receives a broadcast signal wirelessly through an antenna, and a mode (hereafter, cable reception mode) that receives a broadcast signal by wire through a cable, as a reception mode.

The controller 170 may control the impedance matching circuit 111 according to the reception mode of the image display device 100 to adjust the input impedance value of the image display device 100. For example, the controller 170 may change the resistance value of the variable resistor R provided in the impedance matching circuit 111 according to the reception mode of the image display device 100 to adjust the input impedance value of the image display device 100.

When the reception mode of the image display device 100 is a cable reception mode, the controller 170 controls the impedance matching circuit 111 so that the input impedance value of the image display device 100 is adjusted to a certain reference impedance value. Here, the certain reference impedance value may be an impedance value that satisfies a certain reference related to a return loss with respect to a broadcast signal. For example, the certain reference impedance value may be the same as a characteristic impedance value (e.g., 75Ω) of the cable.

Meanwhile, when the reception mode of the image display device 100 is the antenna reception mode, the controller 170 may control the impedance matching circuit 111 so that the input impedance value of the image display device 100 is adjusted to be less than a certain reference impedance value.

That is, when receiving a broadcast signal wirelessly through an antenna, it is not necessary to consider the noise signal returning to the broadcast network due to return loss. Therefore, the controller 170 may increase the amount of input current input to the tuner unit 110 by setting the input impedance value of the image display device 100 to be small. In this case, when the tuner unit 110 includes a low noise amplifier (LNA), the gain of the low-noise amplifier (LNA) can be improved by increasing the magnitude of the input current input to the tuner unit 110, thereby improving the reception performance of the broadcast signal of the image display device 100.

Meanwhile, when a broadcast signal is received by wire through a cable, the return loss is reduced through impedance matching between the image display device 100 and the cable, thereby reducing the noise signal returned to the broadcast network.

Meanwhile, in the case where the reception mode of the image display device 100 is the cable reception mode, when searching at least one broadcast channel through the broadcast signal, the controller 170 may control the impedance matching circuit 111 so that the input impedance value of the image display device 100 is adjusted to be less than a certain reference impedance value.

For example, in the case where the reception mode of the image display device 100 is the cable reception mode, when searching at least one broadcast channel through the broadcast signal, the controller 170 may set the input impedance value to be small, thereby increasing the magnitude of the input current input to the tuner unit 110, and improving the gain of the low-noise amplifier (LNA). Accordingly, the reception performance for the broadcast signal and the channel search performance of the image display device 100 can be improved.

Meanwhile, when the reception mode of the image display device 100 is the cable reception mode, the controller 170 may control the impedance matching circuit 111, based on the signal strength of a broadcast channel set as a main channel.

The controller 170 may control the tuner unit 110 to tune a broadcast channel selected by a user.

At this time, in the case where the reception mode of the image display device 100 is the cable reception mode, when the signal strength of the broadcast channel set as a main channel is greater than or equal to a certain reference signal strength, the controller 170 may control the impedance matching circuit 111 so that the input impedance value is adjusted to a certain reference impedance value.

Meanwhile, in the case where the reception mode of the image display device 100 is the cable reception mode, when the signal strength of a broadcast channel set as a main channel is less than a certain reference signal strength, the controller 170 may control the impedance matching circuit 111 so that the input impedance value of the image display device 100 is adjusted to be less than a certain reference impedance value.

In this case, as the signal strength of the broadcast channel set as a main channel decreases, the controller 170 may control the impedance matching circuit 111 to allow the input impedance value of the image display device 100 to decrease.

For example, when the signal strength of a broadcast channel set as a main channel is less than a certain reference signal strength or greater than or equal to an auxiliary signal strength, the controller 170 may control the impedance matching circuit 111 such that the input impedance value is adjusted to a first auxiliary impedance value smaller than a certain reference impedance value.

For example, when the signal strength of the broadcast channel set as a main channel is less than the auxiliary signal strength, the controller 170 may control the impedance matching circuit 111 such that the input impedance value is adjusted to a second auxiliary impedance value smaller than the first auxiliary impedance value.

That is, when the signal strength of the broadcast signal is small, even if the return loss is slightly increased, the magnitude of the noise signal returned to the broadcast network is small, and it is necessary to improve the gain of a low-noise amplifier (LNA) to provide a user with a better quality broadcast image. Therefore, the controller 170 may control the impedance matching circuit 111 so that the input impedance value of the image display device 100 is smaller than a certain reference impedance value.

Meanwhile, in the case where the reception mode of the image display device 100 is the antenna reception mode or in the case where the reception mode of the image display device 100 is the cable reception mode, when at least one broadcast channel is searched through a broadcast signal, the input impedance value may be adjusted to be less than or equal to a second auxiliary impedance value.

The display 180 may generate a driving signal by converting an image signal, a data signal, an OSD signal, a control signal processed in the controller 170, or an image signal, a data signal, a control signal, and the like received from the external device interface unit 130.

The display 180 may include a display panel (not shown) including a plurality of pixels.

The plurality of pixels provided in the display panel may include RGB sub-pixel. Alternatively, the plurality of pixels provided in the display panel may include RGBW sub-pixel. The display 180 may generate a driving signal for a plurality of pixels by converting an image signal, a data signal, an OSD signal, a control signal, etc. processed in the controller 170.

The display 180 may be a plasma display panel (PDP), a liquid crystal display (LCD), an organic light emitting diode (OLED), a flexible display, and the like, and also may be a 3D display. The 3D display 180 may be divided into a non-glasses type and a glasses type.

Meanwhile, the display 180 may be configured as a touch screen and used as an input device in addition to an output device.

The audio output unit 185 receives the voice-processed signal from the controller 170 and outputs it as a voice.

The image signal image-processed in the controller 170 may be input to the display 180, and displayed as an image corresponding to a relevant image signal. In addition, the image signal image-processed in the controller 170 may be input to an external output device through the external device interface unit 130.

The voice signal processed in the controller 170 may be audio-output to the audio output unit 185. In addition, the voice signal processed in the controller 170 may be input to an external output device through the external device interface unit 130.

Although not shown in FIG. 2A, the controller 170 may include a demultiplexer, an image processing unit, and the like. This will be described later with reference to FIG. 3.

In addition, the controller 170 may control overall operations inside the image processing device 100.

For example, the controller 170 may control the tuner unit 110 to tune a broadcast corresponding to a channel selected by a user or a pre-stored channel.

In addition, the controller 170 may control the image processing device 100 according to a user command input through the user input interface unit 150 or an internal program.

Meanwhile, the controller 170 may control the display 180 to display an image. In this case, the image displayed on the display 180 may be a still image or a moving image, and may be a 2D image or a 3D image.

Meanwhile, the controller 170 may enable a certain 2D object to be displayed in an image displayed on the display 180. For example, an object may be at least one of an accessed web screen (newspaper, magazine, etc.), an electronic program guide (EPG), various menus, a widget, an icon, a still image, a moving picture, and a text.

Meanwhile, the image processing device 100 may further include a photographing unit (not shown). The photographing unit may photograph a user. The photographing unit may be implemented with a single camera, but is not limited thereto, and may be implemented with a plurality of cameras. Meanwhile, the photographing unit may be embedded in the image processing device 100 at an upper portion of the display 180 or may be separately disposed. Image information photographed by the photographing unit may be input to the controller 170.

The controller 170 may recognize the location of a user, based on the image photographed by the photographing unit. For example, the controller 170 may determine a distance (z-axis coordinate) between a user and the image processing device 100. In addition, the controller 170 may determine the x-axis coordinates and the y-axis coordinates in the display 180 corresponding to user's location.

The controller 170 may detect user's gesture based on the image photographed by the photographing unit, or each or a combination of signals detected from the sensor unit.

The power supply unit 190 may supply a corresponding power throughout the image processing device 100. In particular, it is possible to supply power to the controller 170 that can be implemented in the form of a system on chip (SOC), the display 180 for displaying an image, and the audio output unit 185 for outputting an audio, etc.

Specifically, the power supply unit 190 may include a converter (not shown) that converts AC power into DC power, and a Dc/Dc converter (not shown) that converts the level of DC power.

The remote control device 200 may transmit a user input to the user input interface unit 150. To this end, the remote control device 200 may use Bluetooth, Radio Frequency (RF) communication, Infrared Radiation communication, Ultra-wideband (UWB), ZigBee method, etc. In addition, the remote control device 200 may receive an image, a voice, or a data signal output from the user input interface unit 150, and the remote control device 200 can display or voice-output the received image, voice, or data signal.

Meanwhile, the above-described image processing device 100 may be a fixed or mobile digital broadcasting receiver capable of receiving a digital broadcasting.

Meanwhile, the block diagram of the image processing device 100 shown in FIG. 2A is just a block diagram for an embodiment of the present disclosure, and each component of the block diagram may be incorporated, added, or omitted depend on a specification of the image processing device 100 that is actually implemented.

That is, two or more components may be combined into a single component, or a single component may be subdivided into two or more components as needed. In addition, the function performed in each block is for explaining the embodiment of the present disclosure, and the specific operation or device does not limit the scope of the present disclosure.

Figure 3:
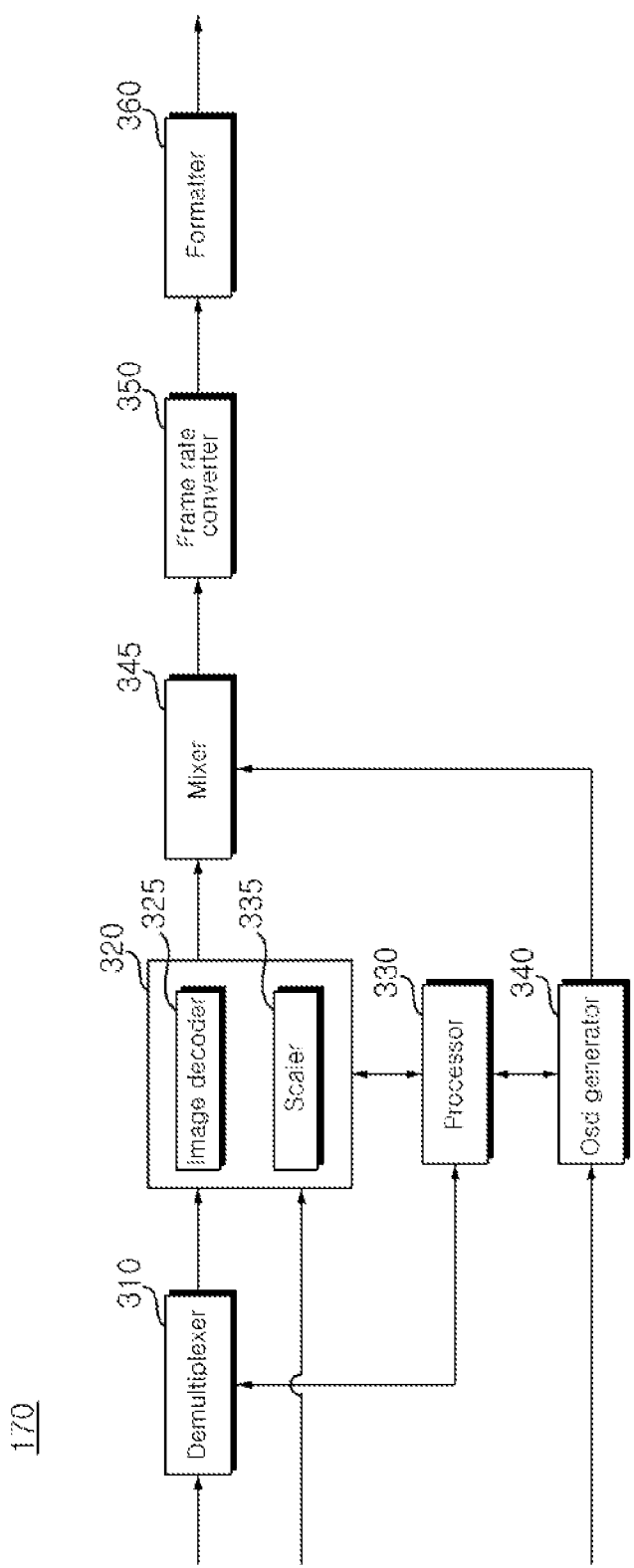
FIG. 3 is an internal block diagram of a controller of FIG. 2A.

FIG. 3 is an internal block diagram of the controller of FIG. 2A.

Referring to FIG. 3, the controller 170 according to an embodiment of the present disclosure may include a demultiplexer 310, an image processing unit 320, a processor 330, an OSD generator 340, a mixer 345, a frame rate converter 350, and/or a formatter 360. In addition, an audio processing unit (not shown) and a data processing unit (not shown) may be further included.

The demultiplexer 310 may demultiplex an input stream. For example, when MPEG-2 TS is input, it can be demultiplexed and separated into image, voice, and data signal. Here, the stream signal input to the demultiplexer 310 may be a stream signal output from the tuner unit 110, the demodulation unit 120, or the external device interface unit 130.

The image processing unit 320 may perform image processing of the demultiplexed image signal. To this end, the image processing unit 320 may include an image decoder 325 and a scaler 335.

The image decoder 325 may decode the demultiplexed image signal, and the scaler 335 may perform scaling so that the resolution of the decoded image signal can be output from the display 180.

The image decoder 325 may include a decoder of various standards. For example, it may include an MPEG-2, H.264 decoder, a 3D image decoder for a color image and a depth image, a decoder for a multi-view image, and the like.

The processor 330 may control overall operations inside the image processing device 100 or the controller 170. For example, the processor 330 may control the tuner unit 110 to tune a broadcast corresponding to a channel selected by a user or a pre-stored channel.

In addition, the processor 330 may control the image processing device 100 according to a user command input through the user input interface unit 150 or an internal program.

In addition, the processor 330 may perform data transmission control with the network interface unit 135 or the external device interface unit 130.

In addition, the processor 330 may control operations of the demultiplexer 310, the image processing unit 320, the OSD generator 340, and the like inside the controller 170.

The OSD generator 340 may generate an OSD signal according to a user input or by itself. For example, a signal for displaying various types of information as a graphic or a text on the screen of the display 180 may be generated, based on a user input signal input through the input unit 160.

The generated OSD signal may include various data such as a user interface screen of the image processing device 100, various menu screens, a widget, and an icon. In addition, the generated OSD signal may include a 2D object or a 3D object.

In addition, the OSD generator 340 may generate a pointer that can be displayed on the display 180, based on a pointing signal input from the remote control device 200.

The OSD generator 340 may include a pointing signal processing unit (not shown) that generates a pointer. A pointing signal processing unit (not shown) may be provided separately instead of being provided in the OSD generator 240.

The mixer 345 may mix the OSD signal generated by the OSD generator 340 and the decoded image signal image-processed by the image processing unit 320. The mixed image signal may be provided to the frame rate converter 350.

The frame rate converter (FRC) 350 may convert a frame rate of an input image. Meanwhile, the frame rate converter 350 may output intactly, without a separate frame rate conversion.

The formatter 360 may arrange a left-eye image frame and a right-eye image frame of the frame rate-converted 3D image. In addition, it may output a synchronization signal Vsync for opening the left eye glass and the right eye glass of a 3D viewing device (not shown).

Meanwhile, the formatter 360 may convert the format of an input image signal into an image signal that is to be displayed on the display 180, and output it.

In addition, the formatter 360 may change the format of the 3D image signal. For example, it may change into any one format of various 3D formats such as Side by Side format, Top/Down format, Frame Sequential format, Interlaced format, and Checker Box format.

Meanwhile, the formatter 360 may convert a 2D image signal into a 3D image signal. For example, according to a 3D image generation algorithm, it may detect an edge or a selectable object from a 2D image signal, and separate an object according to the detected edge or the detected selectable object into a 3D image signal. In this case, as described above, the generated 3D image signal may be separated and arranged into a left-eye image signal L and a right-eye image signal R.

Meanwhile, although not shown in the drawing, it is also possible that a 3D processor (not shown) for processing a 3-dimensional effect signal is further disposed, after the formatter 360. Such a 3D processor may process brightness, tint, and color adjustment of an image signal so as to improve a 3D effect. For example, signal processing or the like that makes a near field to be clear and makes a far distance to be blurry may be performed. Meanwhile, the function of the 3D processor may be merged into the formatter 360 or integrated into the image processing unit 320.

Meanwhile, the audio processing unit (not shown) in the controller 170 may perform audio processing of the demultiplexed voice signal. To this end, the audio processing unit (not shown) may include various decoders.

In addition, the audio processing unit (not shown) in the controller 170 may process a Base, a Treble, a volume control, and the like.

A data processing unit (not shown) in the controller 170 may perform data processing of the demultiplexed data signal. For example, when the demultiplexed data signal is an encoded data signal, it can be decoded. The encoded data signal may be electronic program guide information including broadcast information such as start time and end time of a broadcast program aired on each channel.

Meanwhile, the block diagram of the controller 170 shown in FIG. 3 is only a block diagram for an embodiment of the present disclosure, and each component of the block diagram may be integrated, added, or omitted according to the specification of the controller 170 that is actually implemented.

In particular, the frame rate converter 350 and the formatter 360 may not be provided in the controller 170, but may be separately provided, or may be provided as a separate single module.

Figure 4:
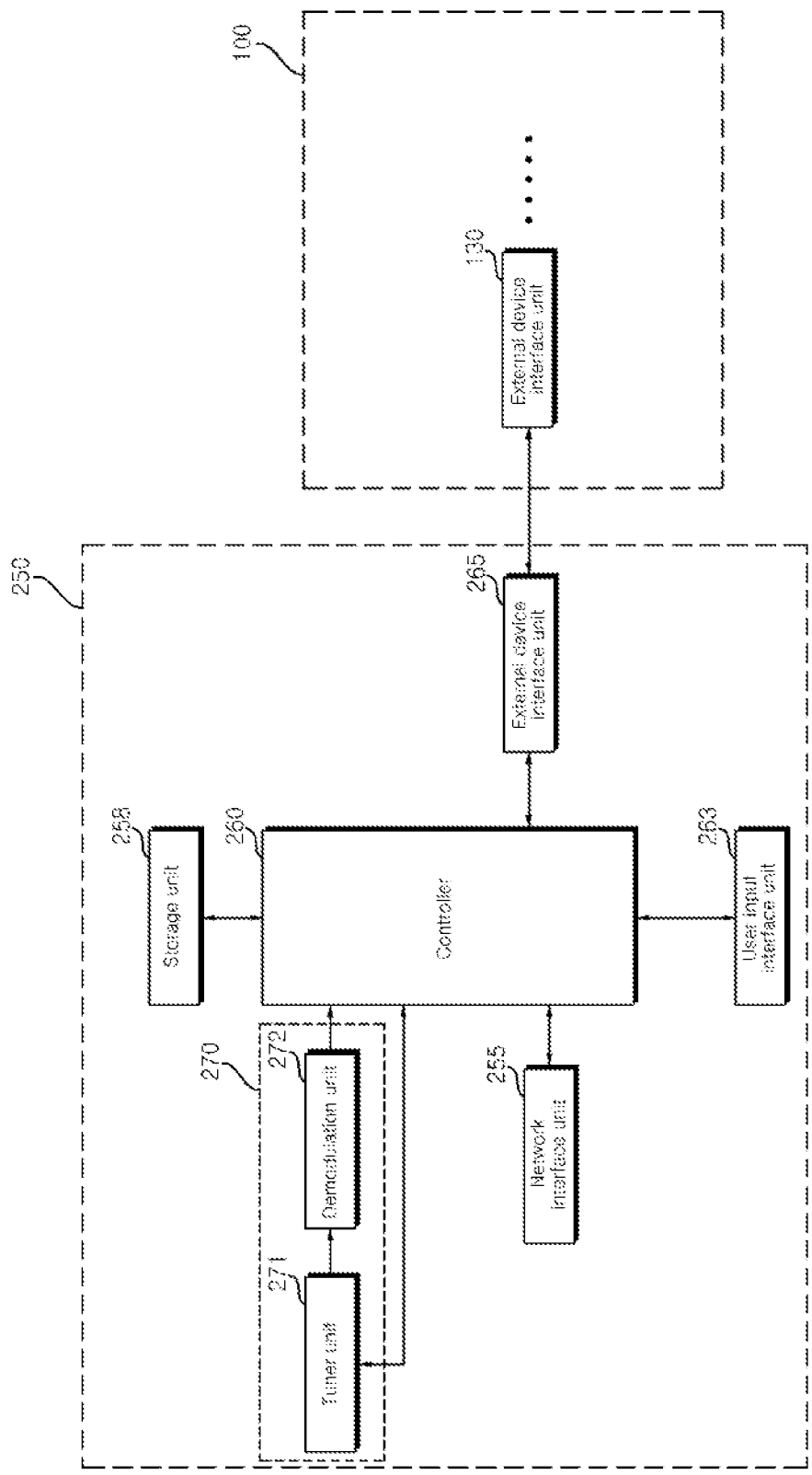
FIG. 4 is an internal block diagram of a broadcast receiving apparatus of FIG. 1B.

FIG. 4 is an internal block diagram of the broadcast receiving apparatus of FIG. 1B. A detailed description of the content overlapping with the content described in FIGS. 2A and 2B will be omitted.

Referring to FIG. 4, the set-top box 250 for receiving a broadcast signal may include a broadcast receiving unit 270, an external device interface unit 265, a network interface unit 255, a storage unit 258, a user input interface unit 263, and/or a controller 260.

The broadcast receiving unit 270 may include a tuner unit 271 and a demodulation unit 272.

The tuner unit 271 may select a broadcast signal corresponding to a channel selected by a user or all previously stored channels among broadcast signals received through an antenna (not shown) or a cable (not shown).

The tuner unit 271 may include an impedance matching circuit (not shown) for adjusting the input impedance of the set-top box 250, and an amplifier circuit (not shown) for bypassing or amplifying the received broadcast signal.

The demodulation unit 272 may receive the digital IF signal DIF converted by the tuner unit 271 and perform a demodulation operation, and, after performing the demodulation and channel decoding, output the stream signal TS to the controller 260.

The external device interface unit 265 may transmit or receive data to or from a connected external device. To this end, the external device interface unit 265 may include an A/V input/output unit (not shown).

The external device interface unit 265 may be connected to an external device such as an image display device (e.g., the image display device 100) such as a TV or a monitor in a wired/wireless manner, and perform input/output operation with the external device.

In addition, the external device interface unit 265 may establish a communication network with various remote control devices 200 as shown in FIG. 1B, and receive a controls signal related to the operation of the set-top box 250 from the remote control device 200, or transmit data related to the operation of the set-top box 250 to the remote control device 200.

The A/V input/output unit may output image and voice signals to an external device.

The external device interface unit 265 may include a wireless communication unit (not shown) for short-range wireless communication with other electronic device.

The network interface unit 255 may provide an interface for connecting to a wired/wireless network including the Internet network. For example, the network interface unit 255 may receive content or data provided by the Internet or a content provider or network operator, through a network.

The storage unit 258 may store a program of the controller 260 for processing and controlling each signal, and may store a signal-processed image, voice, or data signal.

The program stored in the storage unit 258 is not particularly limited as long as it can be executed by the controller 260.

The user input interface unit 263 may transmit a signal input by the user to the controller 260, or may transmit a signal to a user from the controller 260. For example, it may receive various control signals, such as power on/off, operation input, and setting input, input through a local key (not shown) or the remote control device 200, and transmit to the controller 260.

Meanwhile, the set-top box 250 may further include a media input unit (not shown) for playing a separate media. As an example of such a media input unit, a Blu-ray input unit (not shown) may be exemplified. That is, the set-top box 250 may include a Blu-ray player or the like. The media such as an input Blu-ray disc may be transmitted to the image display device 100 through the external device interface unit 265, for displaying it, after signal processing such as demultiplexing or decoding in the controller 260.

The controller 260 may perform signal processing of an input signal. For example, demultiplexing or decoding of an image signal input through the broadcast receiver 270 may be performed, and demultiplexing or decoding of an input voice signal may be performed. For this, an image decoder or a voice decoder may be provided. The signal-processed image signal or voice signal may be transmitted to the image display device 100 through the external device interface unit 265.

The controller 260 may set a mode of the set-top box 250, and may operate according to the mode.

The controller 260 may control the impedance matching circuit provided in the tuner unit 271 according to the reception mode of the set-top box 250 to adjust the input impedance value of the set-top box 250.

When the reception mode of the set-top box 250 is the cable reception mode, the controller 260 may control the impedance matching circuit so that the input impedance value of the set-top box 250 is adjusted to a certain reference impedance value.

Meanwhile, when the reception mode of the set-top box 250 is the antenna reception mode, the controller 260 may control the impedance matching circuit so that the input impedance value of the set-top box 250 is adjusted to be less than a certain reference impedance value.

Meanwhile, when the reception mode of the set-top box 250 is the cable reception mode, in the case of searching at least one broadcast channel through a broadcast signal, the controller 260 may control the impedance matching circuit so that the input impedance value of the set-top box 250 is adjusted to be less than a certain reference impedance value.

Meanwhile, when the reception mode of the set-top box 250 is the cable reception mode, the controller 260 may control the impedance matching circuit, based on the signal strength of a broadcast channel set as a main channel.

In the case where the reception mode of the set-top box 250 is the cable reception mode, when the signal strength of the broadcast channel set as a main channel is greater than or equal to a certain reference signal strength, the controller 260 may control the impedance matching circuit so that the input impedance value of the set-top box 250 is adjusted to a certain reference impedance value.

Meanwhile, in the case where the reception mode of the set-top box 250 is the cable reception mode, when the signal strength of the broadcast channel set as a main channel is less than a certain reference signal strength, the controller 260 may control the impedance matching circuit so that the input impedance value of the set-top box 250 is adjusted to be less than a certain reference impedance value.

In this case, as the signal strength of the broadcast channel set as a main channel decreases, the controller 260 may control the impedance matching circuit so as to decrease the input impedance value of the set-top box 250.

Figure 5:
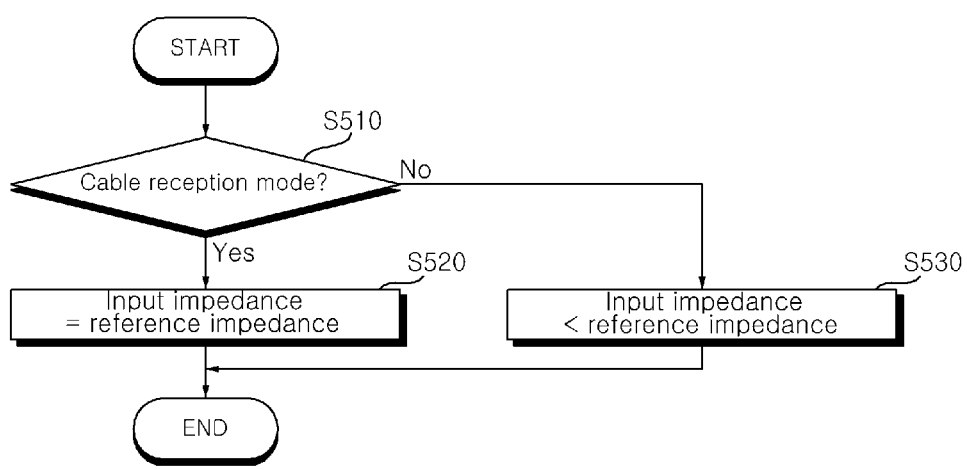
FIGS. 5 to 7 are flowcharts of a method of operating a broadcast receiving apparatus according to various embodiments of the present disclosure.

FIG. 5 is a flowchart illustrating a method of operating a broadcast receiving apparatus according to an embodiment of the present disclosure.

Referring to FIG. 5, the broadcast receiving apparatus (e.g., the image display device 100 or the set-top box 250) may check whether the reception mode of the broadcast receiving apparatus is the cable reception mode, at operation S510.

For example, according to a user input signal received from the remote control device 200, the reception mode of the broadcast receiving apparatus may be set to one of an antenna reception mode and a cable reception mode.

At operation S520, when the reception mode of the broadcast receiving apparatus is the cable reception mode, the broadcast receiving apparatus may control the impedance matching circuit so that the input impedance value of the broadcast receiving apparatus is adjusted to a certain reference impedance value (e.g., 75Ω).

Meanwhile, at operation S530, when the reception mode of the broadcast receiving apparatus is not the cable reception mode, that is, when it is the antenna reception mode, the broadcast receiving apparatus may control the impedance matching circuit so that the input impedance value of the broadcast receiving apparatus is adjusted to be less than a certain reference impedance value (e.g., 75Ω).

As described above, when receiving a broadcast signal by wire through a cable, it is possible to reduce the noise signal returning to the broadcast network by reducing the return loss through impedance matching between the broadcast receiving apparatus and the cable. In addition, when receiving a broadcast signal wirelessly through an antenna, it is not necessary to consider a noise signal returning to the broadcast network due to return loss. Therefore, it is possible to improve the reception performance for a broadcast signal by setting the input impedance value of the broadcast receiving apparatus to be small.

Figure 6:
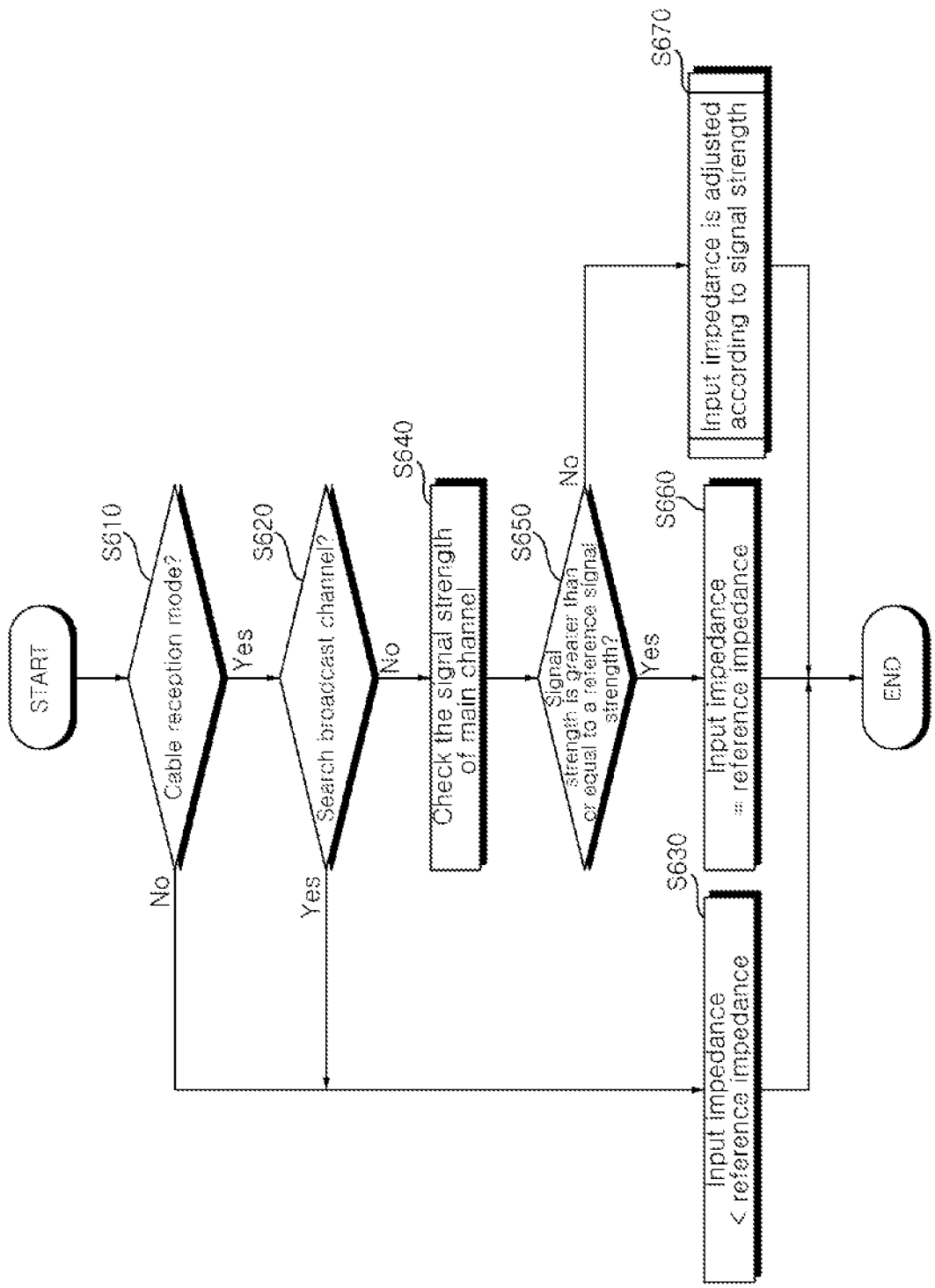
Figure 7:
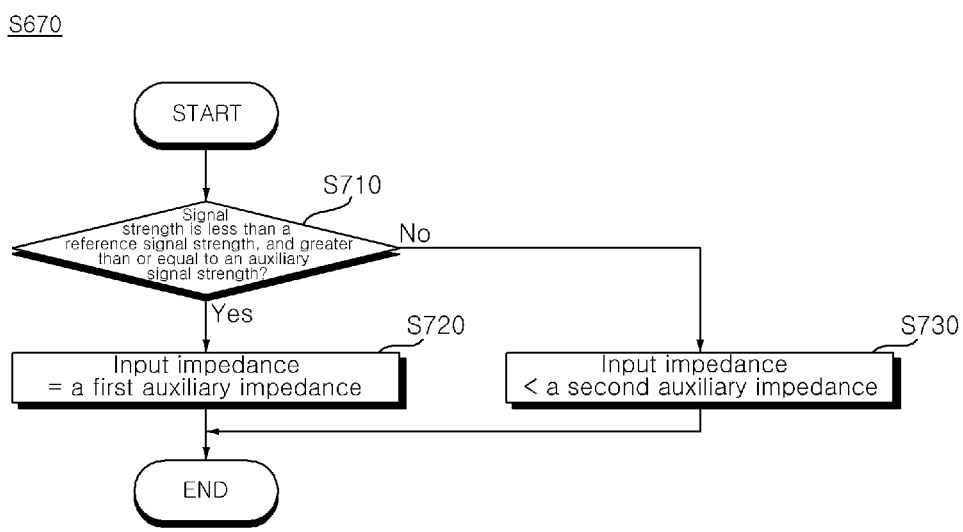

FIGS. 6 and 7 are flowcharts of a method of operating a broadcast receiving apparatus according to an embodiment of the present disclosure.

Referring to FIG. 6, the broadcast receiving apparatus (e.g., the image display device 100 or the set-top box 250) may check whether the reception mode of the broadcast receiving apparatus is the cable reception mode, at operation S610.

For example, according to a user input signal received from the remote control device 200, the reception mode of the broadcast receiving apparatus may be set to any one of an antenna reception mode and a cable reception mode.

At operation S620, when the reception mode of the broadcast receiving apparatus is the cable reception mode, the broadcast receiving apparatus may determine whether to perform an operation of searching at least one broadcast channel through a broadcast signal.

At operation S630, when the reception mode of the broadcast receiving apparatus is the antenna reception mode, or when the reception mode of the broadcast receiving apparatus is the cable reception mode, in the case of searching at least one broadcast channel through a broadcast signal, the broadcast receiving apparatus may control the impedance matching circuit so that the input impedance value of the broadcast receiving apparatus is adjusted to be less than a reference impedance value (e.g., 75Ω).

Meanwhile, at operations S640 and S650, in the case where the reception mode of the broadcast receiving apparatus is the cable reception mode, when not performing the operation of searching a broadcast channel, the broadcast receiving apparatus may check the signal strength of the broadcast channel set as a main channel, and may determine whether the signal strength of the broadcast channel set as a main channel is greater than or equal to a certain reference signal strength.

At operation S660, when the signal strength of the broadcast channel set as a main channel is greater than or equal to a certain reference signal strength, the broadcast receiving apparatus may control the impedance matching circuit so that the input impedance value of the broadcast receiving apparatus is adjusted to a certain reference impedance value (e.g. 75Ω).

Meanwhile, at operation S670, when the signal strength of the broadcast channel set as a main channel is less than a certain reference signal strength, the broadcast receiving apparatus may control the impedance matching circuit so that the input impedance value of the broadcast receiving apparatus is adjusted to be less than a reference impedance value (e.g. 75Ω).

In this case, the broadcast receiving apparatus may adjust the input impedance value of the broadcast receiving apparatus, according to the signal strength of the broadcast channel set as a main channel.

Referring to FIG. 7, at operation S710, the broadcast receiving apparatus may determine whether a signal strength of a broadcast channel set as a main channel is less than a certain reference signal strength, and is greater than or equal to an auxiliary signal strength.

At operation S720, when the signal strength of a broadcast channel set as a main channel is less than a certain reference signal strength, and is greater than or equal to an auxiliary signal strength, the broadcast receiving apparatus may control the impedance matching circuit so that the input impedance value of the broadcast receiving apparatus is adjusted to a first auxiliary impedance value smaller than a certain reference impedance value.

Meanwhile, at operation S730, when the signal strength of a broadcast channel set as a main channel is less than the auxiliary signal strength, the broadcast receiving apparatus may control the impedance matching circuit so that the input impedance value of the broadcast receiving apparatus is adjusted to a second auxiliary impedance value smaller than the first auxiliary impedance value.

As described above, even when the broadcast receiving apparatus receives a broadcast signal by wire through a cable, in the case where as the signal strength of the received broadcast signal is small, even if the return loss is slightly increased, the magnitude of the noise signal returned to the broadcasting network is small and if it is necessary to provide a user with better quality broadcast images, the broadcast receiving apparatus may control the impedance matching circuit so that the input impedance value of the broadcast receiving apparatus is smaller than a reference impedance value.

The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

Meanwhile, the method of operating an image display device of the present disclosure can be implemented as computer readable codes on a medium on which a program is recorded. The computer readable medium includes all kinds of recording apparatuses in which data that can be read by a computer system is stored. Examples of the recording medium readable by the processor include a ROM, a RAM, a CD-ROM, a magnetic tape, a floppy disk, an optical data storage device, and the like, and may also be implemented in the form of a carrier wave such as transmission over the Internet. In addition, the processor-readable recording medium may be distributed over network-connected computer systems so that code readable by the processor can be stored and executed in a distributed fashion.

In addition, although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

The invention claimed is:

1. A broadcast receiving apparatus comprising:
    an impedance matching circuit configured to adjust an input impedance value of the broadcast receiving apparatus; and
    a low-noise amplifier configured to bypass or low-noise amplify a broadcast signal; and
    a controller configured to:
    control the impedance matching circuit so that the input impedance value is adjusted to a certain reference impedance value, based on a mode of the broadcast receiving apparatus being a mode of receiving the broadcast signal through a cable, and
    control the impedance matching circuit so that the input impedance value is adjusted to be less than the certain reference impedance value, based on the mode of the broadcast receiving apparatus not being the mode of receiving the broadcast signal through the cable,
    wherein the certain reference value is an impedance value preset to satisfy a certain reference related to a return loss with respect to the broadcast signal,
    wherein, in a case of a mode of receiving the broadcast signal through the cable, the controller is configured to control the impedance matching circuit so that the input impedance value is adjusted to be less than the certain reference impedance value based on searching a broadcast channel through the broadcast signal.

2. The broadcast receiving apparatus of claim 1, wherein, in the case of the mode of receiving the broadcast signal through the cable, the controller is configured to:
    check a signal strength of the broadcast channel set as a main channel,
    control the impedance matching circuit to adjust the input impedance value to the certain reference impedance value based on the signal strength of the broadcast channel set as the main channel being greater than or equal to a certain reference signal strength, and
    control the impedance matching circuit to adjust the input impedance value to be less than the certain reference impedance value based on the signal strength of the broadcast channel set as the main channel being less than the certain reference signal strength.

3. The broadcast receiving apparatus of claim 2, wherein the controller is configured to control the impedance matching circuit so that the input impedance value decreases as the signal strength of the broadcast channel set as the main channel decreases.

4. The broadcast receiving apparatus of claim 3, wherein the controller is configured to:

control the impedance matching circuit so that the input impedance value is adjusted to a first auxiliary impedance value smaller than the certain reference impedance value, based on the signal strength of the broadcast channel set as the main channel being less than the certain reference signal strength and greater than or equal to an auxiliary signal strength, and control the impedance matching circuit so that the input impedance value is adjusted to a second auxiliary impedance value smaller than the first auxiliary impedance value, based on the signal strength of the broadcast channel set as the main channel being less than the auxiliary signal strength.

5. The broadcast receiving apparatus of claim 4, wherein, in the case of not the mode of receiving the broadcast signal through the cable, or in the case of searching the broadcast channel through the broadcast signal in the mode of receiving the broadcast signal through the cable, the controller is configured to control the impedance matching circuit so that the input impedance value is adjusted to the second auxiliary impedance value.

6. The broadcast receiving apparatus of claim 5,
wherein the impedance matching circuit comprises a variable resistor disposed in an input terminal of the low-noise amplifier,
wherein the controller is configured to change a resistance value of the variable resistor so that the input impedance value is adjusted.

7. A method of operating a broadcast receiving apparatus, the method comprising:
a first operation of adjusting an input impedance value of the broadcast receiving apparatus to a certain reference impedance value, based on a mode of the broadcast receiving apparatus being a mode of receiving a broadcast signal through a cable; and
a second operation of adjusting the input impedance value to be less than the certain reference impedance value, based on the mode of the broadcast receiving apparatus not being the mode of receiving the broadcast signal through the cable,
wherein the broadcast receiving apparatus comprises a low-noise amplifier configured to bypass or low-noise amplify the broadcast signal,
wherein the certain reference impedance value is an impedance value that enables a return loss for the broadcast signal to satisfy a certain reference,
wherein, in a case of a mode of receiving the broadcast signal through the cable, the method further comprises controlling so that the input impedance value is adjusted to be less than the certain reference impedance value based on searching a broadcast channel through the broadcast signal.

8. The method of claim 7, wherein the first operation further comprises:
an operation of checking a signal strength of the broadcast channel set as a main channel;
a fourth operation of adjusting the input impedance value to the certain reference impedance value, based on the signal strength of the broadcast channel set as the main channel being greater than or equal to a certain reference signal strength; and
a fifth operation of adjusting the input impedance value to be less than the certain reference impedance value, based on the signal strength of the broadcast channel set as the main channel being less than the certain reference signal strength.

9. The method of claim 8, wherein the fifth operation adjusts the input impedance value to decrease, as the signal strength of the broadcast channel set as the main channel decreases.

10. The method of claim 9, wherein the fifth operation adjusts the input impedance value to a first auxiliary impedance value smaller than the certain reference impedance value, based on the signal strength of the broadcast channel set as the main channel being less than the certain reference signal strength and greater than or equal to an auxiliary signal strength, and
adjusts the input impedance to a second auxiliary impedance value smaller than the first auxiliary impedance value, based on the signal strength of the broadcast channel set as the main channel being less than the auxiliary signal strength.

11. The method of claim 10, wherein at least one of the second operation and the third operation adjusts the input impedance value to the second auxiliary impedance value less than the certain reference value.

* * * * *